(12) United States Patent
Kim

(10) Patent No.: US 11,115,461 B1
(45) Date of Patent: Sep. 7, 2021

(54) SYSTEMS AND METHODS OF USING ASYNCHRONOUS DISTRIBUTED HASH GENERATION FOR ACCELERATED NETWORK FILE TRANSFERS

(71) Applicant: Jason Kim, Milpitas, CA (US)

(72) Inventor: Jason Kim, Milpitas, CA (US)

(*) Notice: Subject to any disclaimer, the term of this patent is extended or adjusted under 35 U.S.C. 154(b) by 0 days.

(21) Appl. No.: 17/093,343

(22) Filed: Nov. 9, 2020

Related U.S. Application Data

(60) Provisional application No. 62/935,396, filed on Nov. 14, 2019.

(51) Int. Cl.
| | |
|---|---|
| *G06F 16/16* | (2019.01) |
| *G06F 15/16* | (2006.01) |
| *H04L 29/08* | (2006.01) |
| *H04L 9/06* | (2006.01) |
| *G06F 12/02* | (2006.01) |
| *H04L 9/32* | (2006.01) |

(52) U.S. Cl.
CPC ............ *H04L 67/06* (2013.01); *H04L 9/0643* (2013.01); *H04L 67/104* (2013.01); *H04L 67/108* (2013.01); *H04L 67/1097* (2013.01)

(58) Field of Classification Search
CPC ..... H04L 67/06; H04L 67/108; H04L 9/0643; H04L 67/104; H04L 67/1097
USPC ......................................................... 709/219
See application file for complete search history.

(56) References Cited

U.S. PATENT DOCUMENTS

| | | | | |
|---|---|---|---|---|
| 7,010,607 | B1* | 3/2006 | Bunton ..................... | H04L 1/18 709/228 |
| 9,020,977 | B1* | 4/2015 | Schouten .......... | H04L 29/08081 707/796 |
| 10,536,278 | B1* | 1/2020 | Donaldson .............. | G06F 21/64 |
| 10,601,711 | B1* | 3/2020 | Matthews ............. | H04L 69/324 |
| 2010/0312749 | A1* | 12/2010 | Brahmadesam .... | H04L 67/1097 707/609 |
| 2012/0089775 | A1* | 4/2012 | Ranade ............... | G06F 16/1744 711/113 |
| 2015/0110264 | A1* | 4/2015 | Wu ....................... | H04L 9/0643 380/28 |
| 2015/0186393 | A1* | 7/2015 | Serlet .................. | G06F 16/1752 707/828 |

(Continued)

*Primary Examiner* — David R Lazaro
*Assistant Examiner* — Berhanu Shitayewoldetadik
(74) *Attorney, Agent, or Firm* — Patricia C. Brzostowicz; Superior Patent Group, LLC

(57) ABSTRACT

Hash operations on large computer files can be relatively slow, but are needed to ensure accurate computer file transmission. The present disclosure covers a system and method to accelerate the process of making hash verified network copies of digital assets (computer files), and is particularly useful in handing computer files that were previously unknown to the file system (e.g. no prior hash values were computed). The system operates by analyzing the computer file into smaller parts, each with a part-offset relative to the parts' position in the original computer file, and generating the hash of the parts simultaneously with the entire computer file hash. The system can commence various network write operations when only a single part hash is available and does not need to wait for a complete computer file hash to be computed. This enables the burden of file transfers to be handled by multiple network peer computers.

11 Claims, 13 Drawing Sheets

(56) References Cited

U.S. PATENT DOCUMENTS

| | | | |
|---|---|---|---|
| 2015/0188715 A1* | 7/2015 | Castellucci | H04L 9/3297 |
| | | | 713/178 |
| 2016/0070771 A1* | 3/2016 | Vermeulen | G06F 11/3006 |
| | | | 707/687 |
| 2016/0335374 A1* | 11/2016 | Mistry | G06F 7/10 |
| 2017/0032054 A1* | 2/2017 | Mistry | G06F 16/9024 |
| 2019/0356609 A1* | 11/2019 | Grunwald | G06F 3/0653 |
| 2020/0092086 A1* | 3/2020 | Raman | H04L 9/0643 |
| 2020/0394154 A1* | 12/2020 | Blackshear | H04L 9/3239 |

\* cited by examiner

Fig. 4

Asset, with two parts processed.

| H1 | H2 | ?? | ?? | ?? | ?? |
|----|----|----|----|----|----|
| B1 | B2 |    |    |    |    |

Container 1
Hash: H0
AssetHash: ??

| Offset | Hash |
|--------|------|
| 0      | H1   |
| 1024   | H2   |

| HashContext | contains info about | used to generate hash |
|-------------|---------------------|-----------------------|
| HC0         | { B1, B2 }          |                       |
| HC1         | { B1 }              | H1                    |
| HC2         | { B2 }              | H2                    |

| Component | file-part-Hash Context |                                     |
|-----------|------------------------|-------------------------------------|
| H1        | { B1 }                 | (e.g. HC0 when H1 was calculated)   |
| H2        | { B1, B2 }             | (e.g. HC0 when H2 was calculated)   |

Fig. 5

| H1 | H2 | H3 | ?? | ?? | ?? |
|----|----|----|----|----|----|
| B1 | B2 | B3 |    |    |    |

Container 1
Hash: H0
AssetHash: ??

| Offset | Hash |
|--------|------|
| 0      | H1   |
| 1024   | H2   |
| 2048   | H3   |

| HashContext | Contains Info About | used to generate hash |
|-------------|---------------------|------------------------|
| HC0         | { B1, B2, B3 }      |                        |
| HC1         | { B1 }              | H1                     |
| HC2         | { B2 }              | H2                     |
| HC3         | { B3 }              | H3                     |

| Component | File-Part-Hash Context | |
|-----------|------------------------|---|
| H1        | { B1 }                 | (e.g. HC0 when H1 was calculated) |
| H2        | { B1, B2 }             | (e.g. HC0 when H2 was calculated) |
| H3        | { B1, B2, B3 }         | (e.g. HC0 when H3 was calculated) |

Fig. 6

| H1 | H2 | H3 | H4 | ?? | ?? |
|----|----|----|----|----|----|
| B1 | B2 | B3 | B4 | ?? |    |

Container 1
Hash: H0
AssetHash: ??

| offset | hash |
|--------|------|
| 0      | H1   |
| 1024   | H2   |
| 2048   | H3   |
| 3072   | H4   |

| HashContext | contains info about | used to generate hash |
|-------------|---------------------|-----------------------|
| HC0         | { B1, B2, B3, B4 }  |                       |
| HC1         | { B1 }              | H1                    |
| HC2         | { B2 }              | H2                    |
| HC3         | { B3 }              | H3                    |
| HC4         | { B4 }              | H4                    |

| component | File-part-hash context | |
|-----------|------------------------|---|
| H1        | { B1 }                 | (e.g. HC0 when H1 was calculated) |
| H2        | { B1, B2 }             | (e.g. HC0 when H2 was calculated) |
| H3        | { B1, B2, B3 }         | (e.g. HC0 when H3 was calculated) |
| H4        | { B1, B2, B3, B4 }     | (e.g. HC0 when H4 was calculated) |

Fig. 7

| H1 | H2 | H3 | H4 | H5 | ?? |
|----|----|----|----|----|----|
| B1 | B2 | B3 | B4 | B5 |    |

Container 1
Hash: H0
AssetHash: ??

| Offset | Hash |
|--------|------|
| 0      | H1   |
| 1024   | H2   |
| 2048   | H3   |
| 3072   | H4   |
| 4096   | H5   |

| HashContext | Contains info about | Used to generate hash |
|-------------|---------------------|----------------------|
| HC0         | { B1, B2, B3, B4, B5 } |                  |
| HC1         | { B1 }              | H1                   |
| HC2         | { B2 }              | H2                   |
| HC3         | { B3 }              | H3                   |
| HC4         | { B4 }              | H4                   |
| HC5         | { B5 }              | H5                   |

| Component | File-part-hash context | |
|-----------|------------------------|---|
| H1        | { B1 }                 | (e.g. HC0 when H1 was calculated) |
| H2        | { B1, B2 }             | (e.g. HC0 when H2 was calculated) |
| H3        | { B1, B2, B3 }         | (e.g. HC0 when H3 was calculated) |
| H4        | { B1, B2, B3, B4 }     | (e.g. HC0 when H4 was calculated) |
| H5        | { B1, B2, B3, B4, B5 } | (e.g. HC0 when H5 was calculated) |

Fig. 8

| H1 | H2 | H3 | H4 | H5 | H6 |
|----|----|----|----|----|----|
| B1 | B2 | B3 | B4 | B5 | B6 |

Container 1
Hash: H0
AssetHash: ??

| Offset | Hash |
|--------|------|
| 0      | H1   |
| 1024   | H2   |
| 2048   | H3   |
| 3072   | H4   |
| 4096   | H5   |
| 5120   | H6   |

| HashKontext | Contains Info About |
|-------------|---------------------|
| HC0 | { B1, B2, B3, B4, B5, B6 } |
| HC1 | { B1 } |
| HC2 | { B2 } |
| HC3 | { B3 } |
| HC4 | { B4 } |
| HC5 | { B5 } |
| HC6 | { B6 } |

| Component | File-Part-Hash Context | |
|-----------|------------------------|---|
| H1 | { B1 } | (e.g. HC0 when H1 was calculated) |
| H2 | { B1, B2 } | (e.g. HC0 when H2 was calculated) |
| H3 | { B1, B2, B3 } | (e.g. HC0 when H3 was calculated) |
| H4 | { B1, B2, B3, B4 } | (e.g. HC0 when H4 was calculated) |
| H5 | { B1, B2, B3, B4, B5 } | (e.g. HC0 when H5 was calculated) |
| H6 | { B1, B2, B3, B4, B5, B6 } | (e.g. HC0 when H6 was calculated) |

Fig. 9

Asset's hash (e.g. name) is H8, generated from HC0

| H1 | H2 | H3 | H4 | H5 | H6 |
|----|----|----|----|----|----|
| B1 | B2 | B3 | B4 | B5 | B6 |

| HashContext | Contains info about | Used to generate hash |
|-------------|---------------------|----------------------|
| HC0 | { B1, B2, B3, B4, B5, B6 } | H8 |
| HC1 | { B1 } | H1 |
| HC2 | { B2 } | H2 |
| HC3 | { B3 } | H3 |
| HC4 | { B4 } | H4 |
| HC5 | { B5 } | H5 |
| HC6 | { B6 } | H6 |

| Component | File-Part-Hash context | |
|-----------|------------------------|---|
| H1 | { B1 } | (e.g. HC0 when H1 was calculated) |
| H2 | { B1, B2 } | (e.g. HC0 when H2 was calculated) |
| H3 | { B1, B2, B3 } | (e.g. HC0 when H3 was calculated) |
| H4 | { B1, B2, B3, B4 } | (e.g. HC0 when H4 was calculated) |
| H5 | { B1, B2, B3, B4, B5 } | (e.g. HC0 when H5 was calculated) |
| H6 | { B1, B2, B3, B4, B5, B6 } | (e.g. HC0 when H6 was calculated) |

Container 2
Hash: H7
AssetHash: H6

| Offset | Hash |
|--------|------|
| 0 | H1 |
| 1024 | H2 |
| 2048 | H3 |
| 3072 | H4 |
| 4096 | H5 |
| 5120 | H6 |

Container1 renamed as Container2 (Given new hash H7)

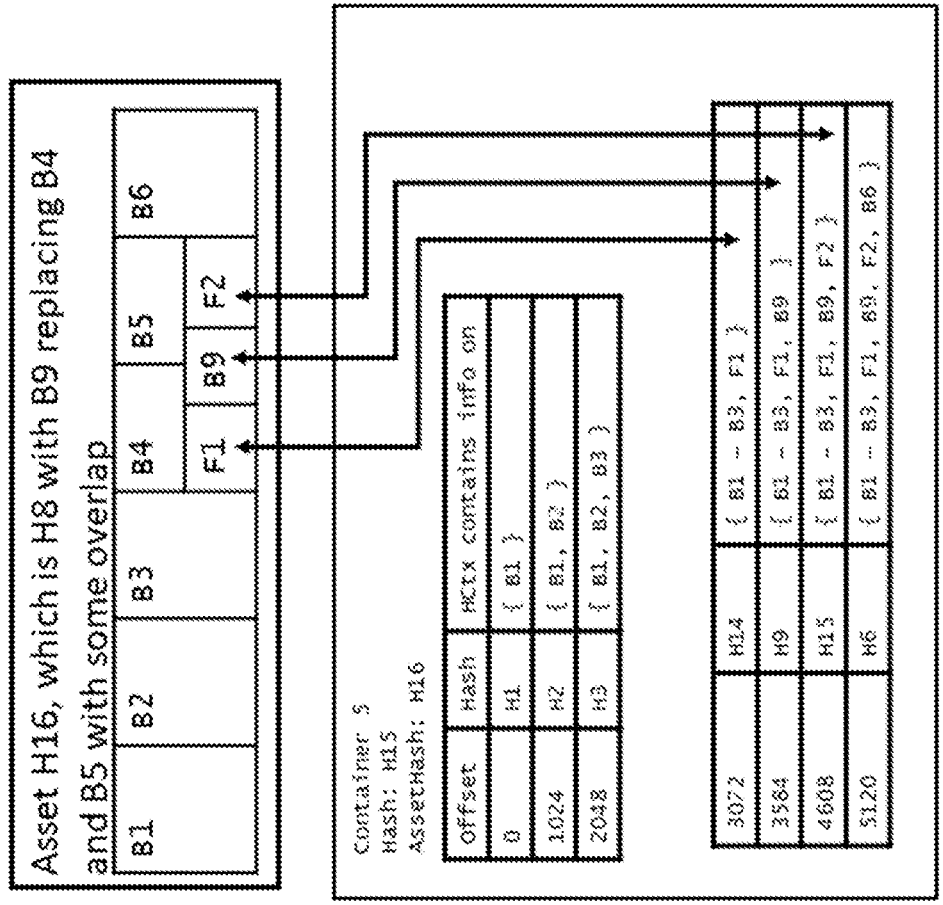
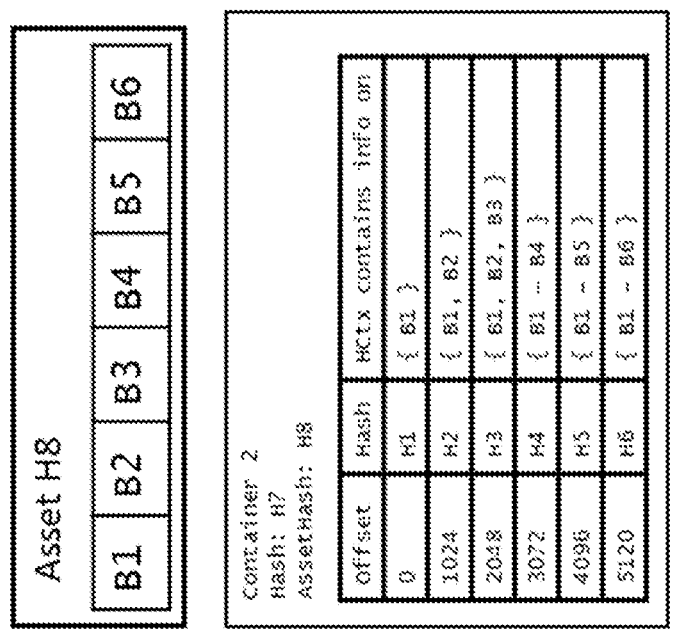
Fig. 13

SYSTEMS AND METHODS OF USING ASYNCHRONOUS DISTRIBUTED HASH GENERATION FOR ACCELERATED NETWORK FILE TRANSFERS

CROSS REFERENCE TO RELATED APPLICATIONS

This application claims the priority benefit of U.S. provisional patent application 62/935,396, filed Nov. 14, 2019, the entire contents of which are incorporated herein by reference.

BACKGROUND OF THE INVENTION

Field of the Invention

The invention is in the field of computer network file transfer systems and methods.

Description of the Related Art

Copying files across a computer network from one machine to another can be fraught with peril. Reliable operation is still elusive, especially when multiple nodes (computers) are concerned. The number of failure points increases with the number of nodes in the network.

There are many software tools available that assist in copying files across a network. Accuracy of file transmission is often facilitated through the use of various verification algorithms, such as hashing algorithms. Hashes are used to verify the contents of a received packet matches what was sent.

Hashing algorithms can be as simple as the classic CRC (Cyclic Redundancy Check, typically CRC32 for a 32 bit CRC). CRC methods have been in use for as long as there have been computers. More recent, more robust exemplars of hashing algorithms are the SHA family of hashing algorithms, such as SHA256.

SHA256—is a very useful hash algorithm (and software) that generates a very large number (256 bits in size, called a "hash") for a given file. If two files are identical, the two hashes are identical. If the files are different, the probability of a false positive (i.e. their hashes are erroneously the same) is less than 1 in $2^{256}$, which is a vanishingly small probability. For all intents and purposes, two files are identical if the hashes are the same, and two files are different if the hashes are different. SHA256, SHA512, and the SHA3 family serves as a very robust CRC (Cyclic Redundancy Check). Comparing hashes is a lot easier than comparing files. SHA256 and similar software are in widespread use internationally. With these modern hashing algorithms, the calculated hash value of a file (or more generally, any sequence of contiguous bytes) can serve as its uniquely identifying name. The chance of an erroneous clash of hash values is so small that it's not worth worrying about. CRC on the other hand, can not be reliably used to uniquely identify files. It is typically used to only to temporarily safeguard very small chunks of data (typically smaller than 64 kilobytes) as they are transmitted from one computer to another.

rsync: is a multi-decade old software tool. It still forms the backbone of many corporate IT infrastructures. For point-to-point copies (i.e. single source, single destination), rsync does a very good job of ensuring that the network copy operation completes properly.

Bittorrent is a more recent representative software technology featuring multiple nodes (computers connected to the internet, interchangeably referred to as "peers") cooperating to distribute a set of files among its peers. It functions by advertising on a webserver somewhere a ".torrent" file, which describes the contents being shared. At least 2 nodes must download the .torrent file, which names the central authority (the IP address and port) of the "tracker" node that has the information about the files being shared. This .torrent file also lists the hashes of all the files being shared as part of that .torrent. This technology works well at distributing files to anonymous peers as well as increasing the overall throughput by using peer nodes that has a chunk to send them to nodes that need it.

BRIEF SUMMARY OF THE INVENTION

While the invention can be both a method, system, or a non-transitory computer storage medium for computer code for a processor to implement the method and system versions of the invention, for simplicity, often the method embodiments of the invention will be provided as specific examples.

The invention is based, in part, on the insight that, because rsync is a discrete tool, it does not have a notion of global correctness. It will blindly do what you ask it to do. It can only guarantee that file X on node A, once copied to node B is identical to original on node A. It has no notion of global error correction because that is beyond the scope of this tool.

The invention is also based, in part, on the insight that like rsync, Bittorrent's notion of correctness is still local, not global. Unlike rsync, Bittorrent's notion of local correctness includes all peers that participate in distributing the particular computer file asset. However, there is nothing preventing a mangled asset from being distributed alongside the correct version, at the same time, and with the same name as the correct version. This can sow confusion and chaos.

The present invention sometimes referred to herein as "REVNET" is intended to overcome some of the disadvantages of both rsync and Bittorrent.

The present invention shares some similarities to both rsync and Bittorrent, but also has some critical differences. The Present invention, rsync, and Bittorrent use hashes (such as CRC) to verify that a transmitted chunk has arrived correctly at the destination. However this is where the resemblance then stops. Rsync and Bittorrrent must first generate the hash of the data being sent, because these hashes must be sent along with the data. Once received, the receiver verifies that the received portion's hash matches the hash that it received. If the hash values match, the received chunk is assumed to be good. If it does not match, the received portion is assumed to be corrupted and is thrown away. Among other problems, however, is that hashes of long computer files can take some time to be generated, and this can slow down the process.

Like Bittorent, REVNET also accelerates network copy by allowing multiple nodes to cooperatively transmit different portions of an asset to interested peer nodes. For example, refer to FIG. 1. Assume four nodes, named A, B, C, and D. All four nodes are interested in distributing an asset A1 composed of 300 bytes. When D requests asset A1, nodes A, B, and C can cooperate by sending different parts of A1—e.g. A might send [1-100] to D, B might send [101-200] to D, C might send [201-300] to D. This toy example scales up to cases where asset sizes are hundreds of megabytes or larger.

The typical way in which assets may be divided among peers is often stochastic—e.g. A through C start sending random portions of the asset to D, reducing the chance of sending duplicate fragments without requiring additional overhead. However, there are some benefits to a more complex protocol that decides the distribution arrangement a-priori.

Despite a few similarities, the present invention is focused on a different problem. Bittorrent is useful for sharing files (relatively) anonymously among geographically distributed peers. However, because of Bittorent's protocol requirements, it's not well suited when the peers are all part of a single intranet. The requirement of setting up a webserver, generating a ".torrent" file, and spooling up at least one initial "seeder" node for every file that needs to be distributed is complex and time-consuming. This can become problematic when latency or simplicity is of concern. For example, when the peers are all within a single corporate intranet (regardless of the geographic distribution of the machines in the intranet), there is no need to set up a webserver to advertise an asset. Clients are mainly concerned with, "I am in San Francisco, and I have this gigantic file on this removable disk. The New York guys need this file, now!"

Bittorrent is primarily used to distribute digital assets that are already "known" (i.e. the user knows that he has the files, and what they contain). However, if the assets are not "known" it must operate with a non-zero latency, which can be significant. According to prior art methods, the system must first calculate the complete hash for one or more potentially very large computer files before peers can start sharing the chunks of the shared assets—i.e. the ".torrent" file requires the hashes for all pieces of the asset. If the asset is new (or if it is assumed to be new) to the system, then the need to generate the hashes for the assets presents unwelcome delay. Even if the assets are assumed to be known, the hashes must be reverified, thereby adding unwelcome, unavoidable latency once again. So Bitttorrent is too slow.

If the asset's file sizes are nontrivial, the requirement of generating/verifying the hash first can add an unacceptable delay, even if the overall throughput of the network copy eventually reaches an acceptable range. The entire computer file (asset) must be examined to generate the hash prior to start of network transmission among peers. Another problem is that Bittorrent also is a per ".torrent" service. Each asset requires a separate service instance, and it has no way to handle duplicate portions between different assets registered with different ".torrents".

By contrast, the present invention discloses an alternative network protocol, here called REVNET, that can form the backbone of a distributed peer-to-peer file system, typically operating within an intranet. At its core, it is a reliable data transport service operating on top of UDP, or optionally TCP.

So, the process of generating a hash for a large computer file can be time-consuming, and a faster method is desired. As previously discussed, when large new or previously unanalyzed computer files (here a computer file can be a binary large object or "BLOB") are first encountered by a network file transfer system, this can delay the process of copying or transferring computer files from one computer to another over a network.

One advantage of the present invention is that it does not need to wait for a complete hash of a computer file to be generated before the transmitting network peer computer begins to transmit the file. Instead, the system operates by analyzing the computer file into a collection of smaller parts, each with a part-offset relative to a given parts' position in the original computer file. The system generates the hash of the parts and the entire computer file simultaneously, side by side with various network write operations distributing these parts, part hashes, and hash contexts for these various part hashes. So the system can start transmitting smaller parts of the larger computer file, along with information concerning the hash value and hash context for the individual parts, and the receiving network computers can start receiving these parts and verifying them before the original computer finishes determining the hash for the complete computer file. This speeds up the computer file transfer process by reducing the start latency to undetectable levels.

Further, as will be described, the system sends enough verification information so that receiving network computers can identify when individual parts are missing or corrupted, and send network requests to retransmit that part, even before the hash for the complete computer file is generated. Further, the system can operate so that the various parts of the original complete computer file can reside on multiple network peer computers, which can work together to help supply missing parts as needed.

BRIEF DESCRIPTION OF THE DRAWINGS

FIG. 4 shows the system now progressing to analyze the second part, H2, which has an offset of 1024 (let's assume in this example, that the offset is 1024 bytes away from the beginning of the computer file). The hash context of H2 is based on the previous hash for the byte sequence (B1) for part H1.

FIG. 5-8 show this process continuing throughout more parts (components) of the computer file (asset).

FIG. 9 shows the process after the last part (component) H6 of the computer file (asset) is analyzed.

FIG. 13 shows the hash re-generation acceleration when the file modification operation overlaps.

DETAILED DESCRIPTION OF THE INVENTION

In some embodiments, the present "REVNET" invention may be an improved system or method of transmitting a computer file (sometimes called an asset) across a network. Expressing the concept in methods format, the invention will typically comprise using at least one transmitting network peer computer (peer), and a hash operation, to divide a computer file (asset) into a plurality of smaller parts (sometimes called components), and describe each part (component) with a part-hash-value, a part-offset (essentially the location of a given part within the larger computer file, such as a bit or byte offset of a given part in a given computer file relative to a start or other reference location of this file), and a file-part-hash-context value (hash context), thereby creating a plurality of part-descriptors.

As hash operations proceed, the hash software typically has a storage buffer that keeps track of the previous state of the hash operation before the next state of the hash operation commences. As will be discussed, in the present invention, file-part-hash-context value (hash context) can be viewed as representing this storage buffer. It is a partial hash of the computer file, such as from the beginning of the first part to the beginning of a given part. (e.g. an intermediate state of an original computer file hash, produced by the hash operation, from a beginning of a computer file to a position of a given part in that computer file).

According to these methods, each individual part can be linked or designated by a part-descriptor comprising that part's part-hash-value, it's part-offset, and the file-part-hash-context value. More specifically, for an arbitrary part, that arbitrary part's part-hash-value is produced by a hash operation on that arbitrary part (each part comprises data, and the hash is on the part's data) from a beginning of that arbitrary part to an end of that arbitrary part.

Various types of hash operations may be used herein. In some embodiments, the hash operations used to generate both the part hash values and the computer file hash are the same hash operations, and these can, for example, comprise any of SHA family hash operations, including SHA2 (e.g. SHA256 or SHA512) and SHA3 (e.g. SHA3-256, SHA3-512) hash operations. Generally, the hash operation is chosen to minimize a probability (often to less than 1 in $10^{80}$) that two different BLOBs (or parts) will be assigned the same hash value.

According to the invention, if a computer file is analyzed into a plurality of parts with, for example, a first part at the beginning of the computer file, and the last part at the end of a computer file: then for the last part of the computer file, the hash operation on the part previous to the last part's file-part-hash-context value, and the last part, equals (is the same as) the hash operation on the entire computer file.

Figure 1:
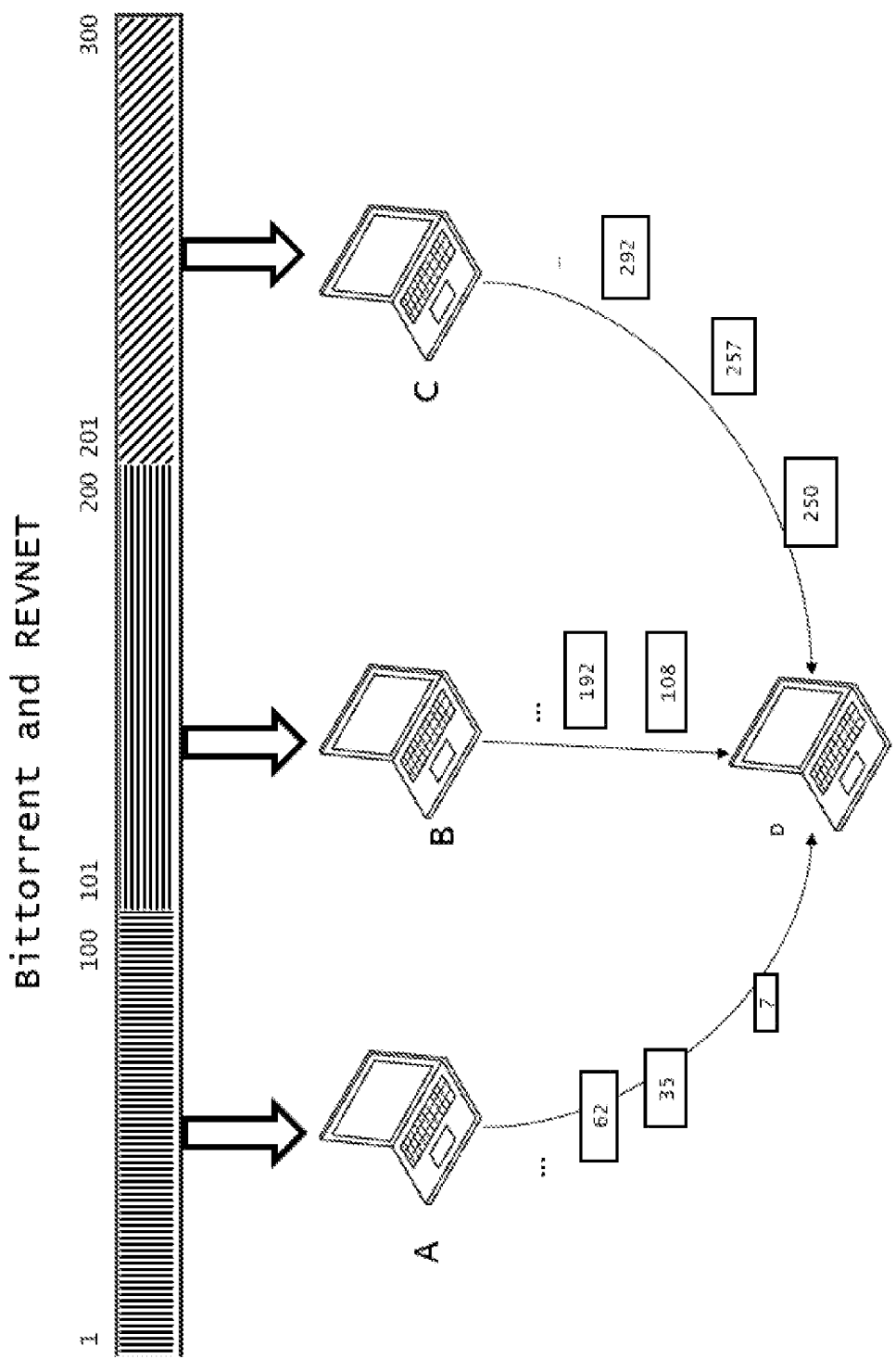
FIG. 1 shows how Bittorrent (prior art) and REVNET (present invention) may accelerate network copying. In this figure, three hosts (network peer computers), named A, B, and C are sending different portions of the asset (computer file) to machine D (another network peer computer).
Figure 2:
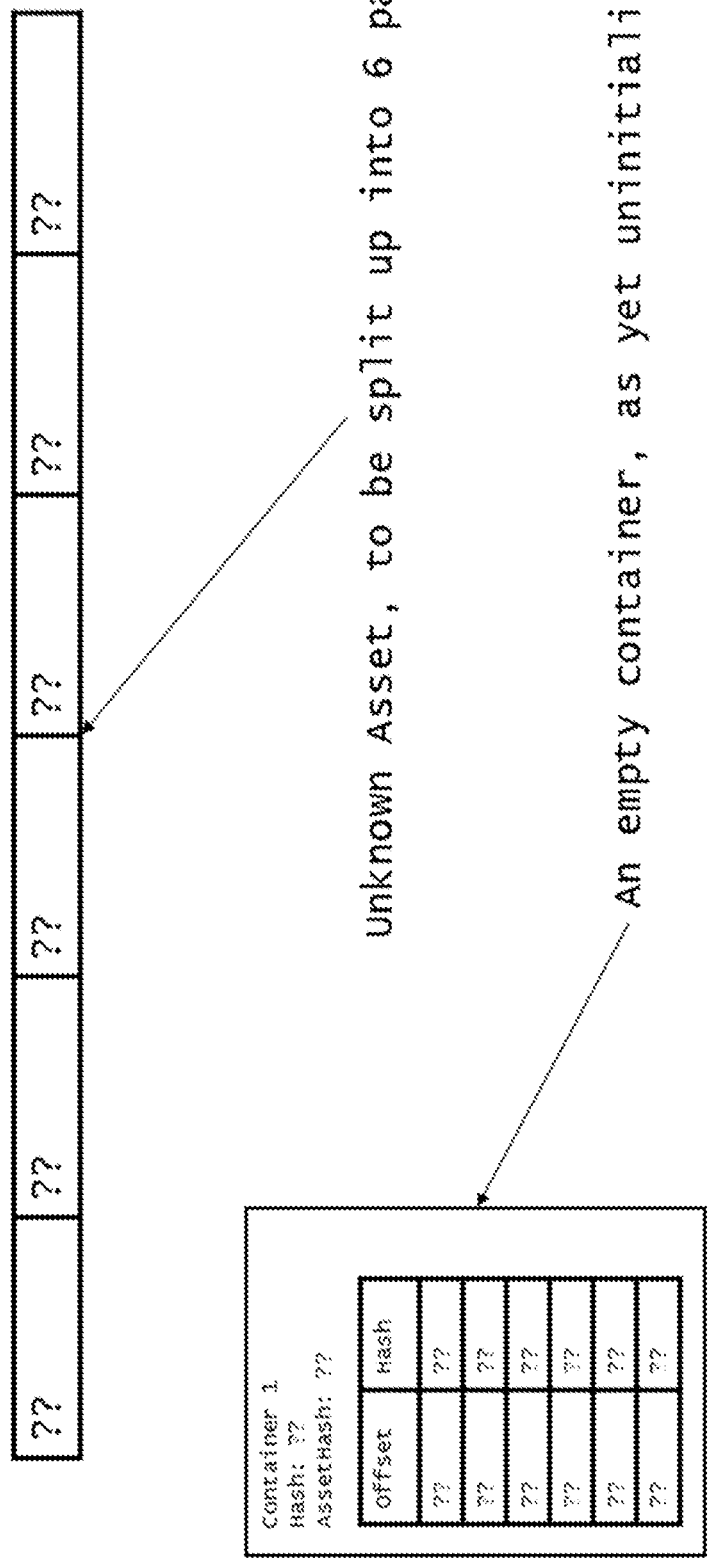
FIG. 2 shows how during initial processing the system divides the computer file (asset) into various components (parts). Initially, no hash operations have been performed, and no parts have been characterized by any part-descriptors. Each part descriptor will ultimately contain at least that part's part-hash-value, and that part's part-offset, showing where the part fits into the overall computer file (asset).

FIG. 2 shows how during initial processing, the system divides a previously unknown computer file (asset) into various components (parts). Initially, no hash operations have been performed, and no parts have been characterized by any part-descriptors. This unknown asset will be diced up into 6 components. Each box represented with '??' represents a portion of the asset with unknown data in it. In FIGS. 3-10, each box will be decorated with its corresponding hash-value of its byte sequence as each part is hashed.

Container1 will eventually represent the unknown asset. Initially, Container1 doesn't have a hash, because no components have been added to it. There are a total of 7 Hash Contexts in play here—One for each Component, used to generate each Component's name (i.e. its hash), and the 7th, which will ultimately contain info about all of the Components, in sequence.

Each part descriptor will ultimately contain at least that part's part-hash-value (i.e. its hash), and that part's part-offset, showing where the part fits into the overall computer file (asset).

As the parts are distributed across the network, each part can either be transmitted separately from its associated part descriptor; or alternatively, each part can be transmitted bundled with its part descriptor (that is the part-descriptor may be appended onto the part).

If a computer file has only one part (e.g. it's not large enough to warrant splitting it), then the file can be identified completely with only one part-descriptor. Usually, however, a computer file will be analyzed into many different parts, each with its own part descriptor. To keep track of this process, often as parts are generated and analyzed, the system will package these part descriptors into 'containers". These containers will contain at least one, and often a plurality of, part descriptors. The container for the entire computer file (i.e. all parts are processed) contain part descriptors for this last part and all of the previous parts in the computer file.

Note that in a preferred embodiment, these containers can comprise a plurality of containers or components (For example, a container of containers can be used to represent hierarchical relationships among assets (such as nested directories of assets). At least some of these containers (see FIGS. 3-10) comprise a plurality of part-descriptors. New containers can be created and retransmitted by at least one network peer computer as the hash operation progresses through at least some of the various parts in the computer file (asset).

In FIGS. 3-9, each of the hash contexts {HC1 through HC6}, are only used to generate individual hashes (H1 through H6) for the corresponding byte sequences {B1 through B6}. However, the part-hash-context for a given part must contain the hashing info for all of the asset from the beginning of the asset to the end of that given part. In other words, for any given part (component) the hash context that was used to generate the prior part's hash must be duplicated and used to process the current part's data. This hash context, is then duplicated and used as the part-hash-context for that part.

Figure 3:
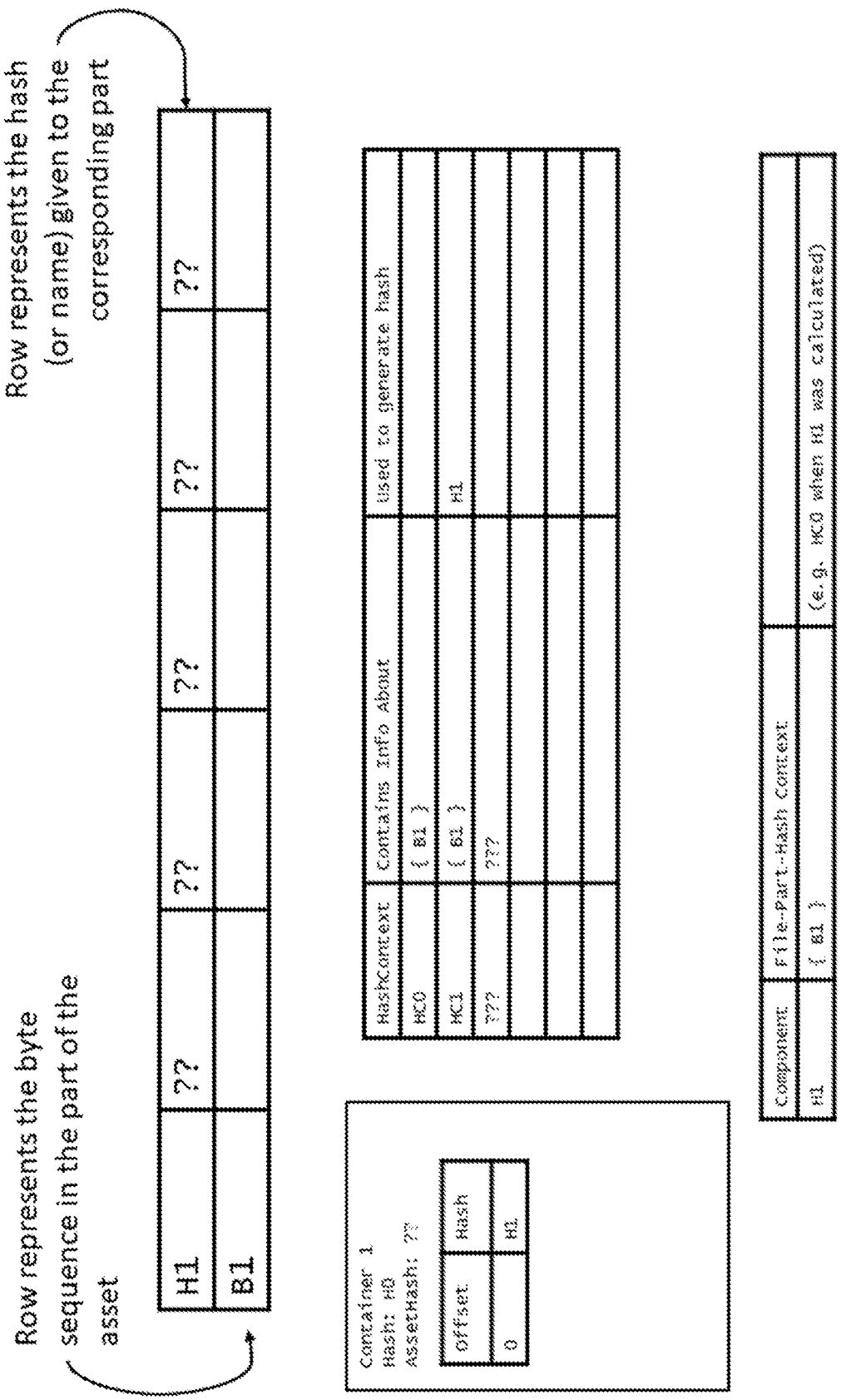
FIG. 3. Shows the system analyzing the first part H1, with offset 0. The hash context typically starts with an initialized value specific to the hash algorithm being used. Only the first part is analyzed here. Therefore, the part-descriptor (described below in Definitions) for part H1 can be simply: part-offset 0, the hash of H1 (hash for H1's byte sequence B1), and the file-part hash context value (also explained below). The container only contains a determined part-descriptor for part H1, and no other defined part-descriptors are present in the container.

FIG. 3 shows the system analyzing the first part H1, with offset 0. The part-descriptor for part H1 is simply offset 0, H1 which is the hash for H1's byte sequence B1, and the initial hash context for the hash algorithm being used (e.g. SHA256). The container only contains a determined part-descriptor for part H1, and no other defined part-descriptors are present in the container. It is important to note that both the containers and the various parts are small (in terms of numbers of bytes) with respect to the size (numbers of bytes) of the original computer file, so the hash for such parts and containers should be completed in a small fraction of a second. Once the part's data has been processed by the hashing algorithm, H1 is generated, and the part's hash context has now been updated to reflect that the byte sequence B1 has been "churned in" (e.g., much like a how a blender might mix the elements thrown into it). In other words the hash context for H1 refers to the current state of the blender just as the first part's data has been processed. Note that once the hash value H1 is generated, H1 serves as the uniquely identifying name of the part. Note that the Container is now assigned a preliminary hash (H0). H0 is simply the hash of the binary sequence {offset, hash}. Here offset is typically 8 bytes (the binary representation of the offset of the part in the file represented as a 64 bit machine integer). And in the case of using SHA256, the hash is then a 32 byte sequence representing the hash of the first part (e.g the byte sequence labeled "B1") of the first part of the file.

An alternate explanation for FIG. 3 is: When the first part of the large asset has been hashed, we can now generate a preliminary hash for Container1, which currently only contains object H1 (the first Component). The Container's hash (H0) is simply the hash of {0, H1}, a 40 byte BLOB consisting of 1 machine integer (offset) and one 32 byte hash for the part (H1). At this point, the two objects H0 and H1 can now be sent to interested peers. H0 (i.e. Container1) is incomplete, as it only has info about the very first Component (H1), but that's ok!

The hash context of object H1 is the current HC0, not HC1 (Although for this case, HC1 and HC0 are the same). HC1 was used to generate the name of the first component (which is H1), and then is thrown away. In other words, the hash context for the asset (HC0) will be duplicated, to be used as the hash context for the part, just as the last byte of that part has been churned in.

The current value of HC0, which will ultimately be used to generate the hash of the ASSET will be saved along with H1. This hash context is also referred to as the file-part-hash context.

FIG. 4 shows the system now progressing to analyze the second part B2, which has an offset of 1024 (e.g. offset is 1024 bytes away from the beginning of the computer file). The hash context of the file (HC0) is updated. It depends on the previous hash for the byte sequence (B1) for part H1 (from FIG. 3) as well as byte sequence B2. In other words, the hash context of the file reflects the fact that two byte sequences B1 and B2 have been "churned in". Note that the same byte sequence (B2) has been churned in with an initial hash context to produce the hash value H2. H2 is the hash only for B2. The hash context of this second component (identified by H2) is the same as HC0, i.e. it contains the state of the hash computation after all of B1 and B2 has been processed. By using this hash context, it is possible to continue the hash from the first byte of B3, without having to re-examine B1 and B2.

Alternatively, the first and second parts of the large asset has been hashed and Container1 still carries around its preliminary hash H0. We don't recalculate the hash for Container1 (even though it has changed). The distribution for the unknown asset has already begun, and the important bits (the components) need to be distributed first. Because every time an unknown Container arrives, the default behavior has to be to fetch all unknown components (or parts) found within it, but that's kind of redundant, as we're already pushing the components over one by one. So we save a bit of bandwidth by reducing unneeded chatter to a minimum. In other words, we can regenerate the hash for the container every time we add a new component to it, but it's wasteful to do so.

The hash context of object H2 is the CURRENT HC0 (containing info about {B1, B2}), NOT HC2! Note that the hash context of object H1 is still only contains the hash info about {B1}.

FIGS. 5-8 show this process continuing throughout more parts (components) of the computer file (asset). In FIG. 5, the first, second and third parts of the large asset has been hashed. Container1 still carries around its preliminary hash H0. The objects H0, H1, H2, and H3 are now available to peers. The rest of FIGS. 6-9 adds another available part (i.e. component) to interested neighbors (peers).

FIG. 9 shows the process after the last part (component) B6 of the computer file (asset) is analyzed. Note that the parts all have their own separate file-part-hash-context values (alternatively referred to as "the HCtx for the part"), allowing for the calculation of H8 (the actual hash of the complete computer file asset) by any network peer computer. The hash for the Container1 has been updated to H7. H7 is simply the hash of the binary sequence {{0, H1}, {1024, H2}, {2048, H3}, {3072, H4}, {4096, H5}, {5120, H6}}. It comprises 6 integers for each of the offsets of the 6 parts in the file and 6 hashes, one for each part. Hash H8 is then the hash of the entirety of the computer file. Container1 has been renamed as Container2. Its hash is now H7, which is generated purely from the offset, ComponentHash for all 6 components. The asset is assigned the hash H8, which was generated from HC0 right after the last byte of the last part is processed.

It is important to note that in some embodiments, the part-hash-context (or hash context, HCtx) for each part is the original HC0, just as the hash for the corresponding data is generated. In each of the FIGS. 3-9, each part's byte sequence is processed twice with two separate hash contexts. First is with the original HC0, and a second initial hash-context-values (HC1 through HC6). The latter generates the hash (name) for each of the part, and the HC0 (which is duplicated at the conclusion of the hashing for that part) is used as the part-hash-context for that part. This part-hash-context for a given part can be used to continue the hashing operation for any bytes of the asset that follow that part without needing to examine all of the prior portions of the asset.

At this point in time, the node (network peer computer) that completes the hashing can notify other interested peers about this completed hash, or other hash intermediate steps, by sending one or more "Meta-Update" messages. These can notify peers as to these changes, and the relationships between the various parts and part-descriptors in the various containers.

Thus, the invention will package least some of the part-descriptors in at least one container; and transmit at least some parts, and the at least one container with at least some of the part-descriptors, to at least one other receiving network peer computer.

Note that although in these examples, the various steps are shown proceeding in a linear part 1, part 2, part 3 . . . part n order, other schemes are also possible. To generalize, the process of using at least one transmitting network peer computer to generate part-descriptors for each the various parts, packaging at least some of these part-descriptors into a container; and transmitting at least some parts, and the container with at least some of these part-descriptors, to at least one other receiving network peer computer can be done by any of a sequential, non-sequential, or random selection process.

The invention will also receive, on at least one other receiving network peer computer, at least some parts as received parts, and received containers comprising at least some of these part-descriptors, as received part-descriptors. Thus, the receiving network peer computer will receive at least some received parts, received part-hash-values, received part-offsets, and received part-hash-context values.

The receiving network peer computer (or indeed any network peer computer) can then use at least some of these received parts, their received part-hash values, the received part offsets, and the received part-hash-context values to perform various functions such as any of:

A) Identify missing/corrupted received parts or missing/corrupted received part containers with missing/corrupted part descriptors, and send network requests for these missing/corrupted received parts or missing/corrupted received part containers.

Here, for example, when the accuracy of a candidate received computer file cannot be verified, the system can use the containers (information in the containers) to determine which parts or selected part descriptors have not been properly received (e.g. may be missing, or corrupted). This lets the relevant network peer computer(s) define which parts and/or part containers were not received. Based on this information, the relevant network peer computer(s) can then send at least one network request (intended to be received and answered by other relevant network peer computers possessing the required data) to transmit or retransmit any of these not-received parts, and not-received containers.

B) Create a candidate received computer file from the received computer file parts if all parts of said file have been received and verified.

C) Regardless of whether all parts of the computer file have been received, continue a hash operation on a received candidate computer file in an absence of certain received parts, by taking from a received container, a received file-part-hash-context value of a file part with the largest part offset, and using its received file-part-hash-context value to continue with the hash operation in an absence of at least some received parts with smaller part offsets.

Figure 10:
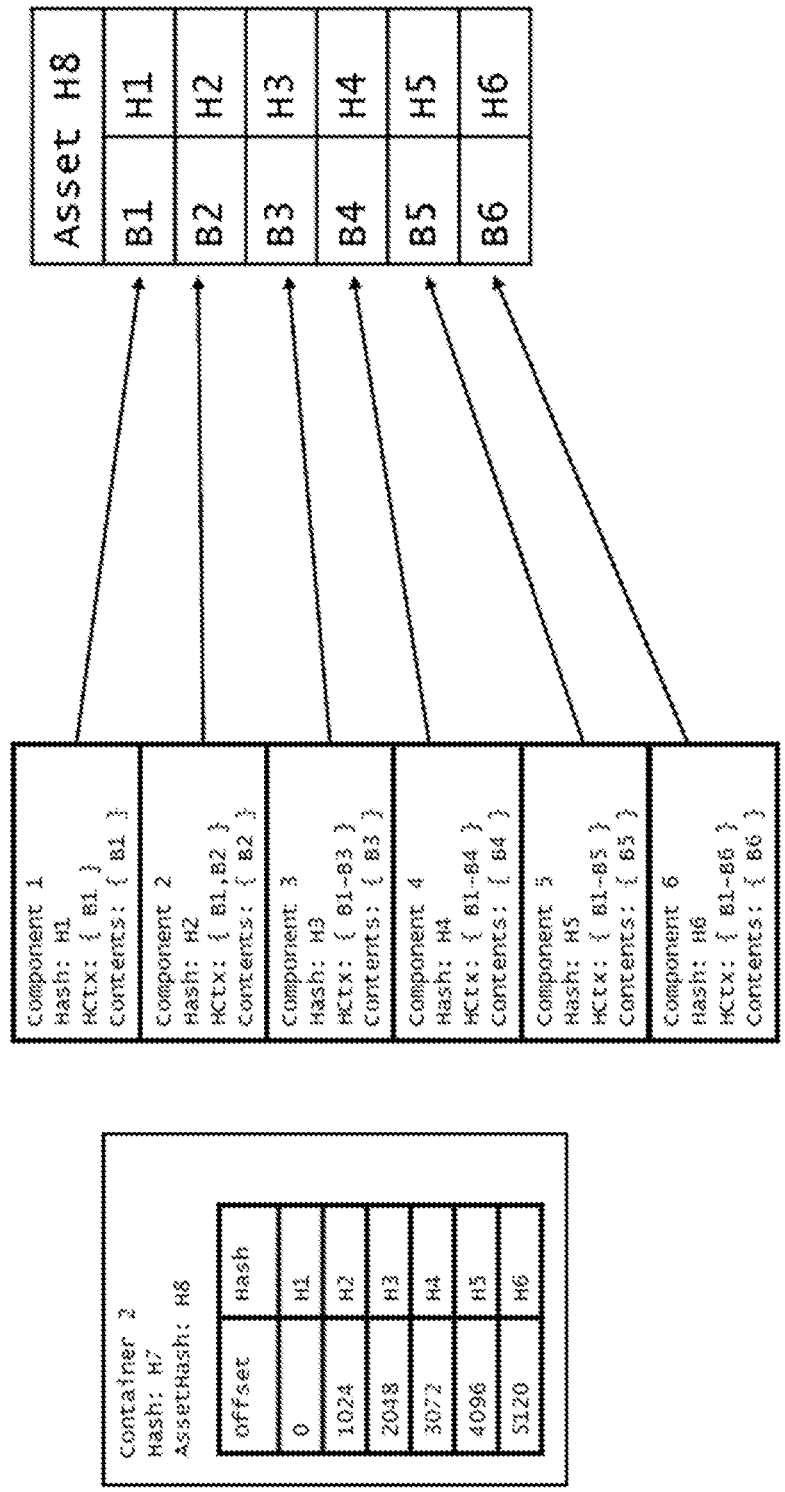
FIG. 10 shows a diagram showing how each part (component) Hx of the computer file (asset), each with byte sequences (contents or B1 . . . B6), can be described by the part's part-hash-value, file-part-hash context (alternatively referred to as "HCtx for the part"). Together, these are sometimes called a "part-descriptor". A container, here a different container 2, can hold these various part-descriptors for the entire computer file, along with an optional overall hash (H8) of the entire computer file.

FIG. 10 details how each part (component) Hx of the computer file (asset), each with byte sequences (contents—Bx), can be described by the part's part-hash-value, file-part-hash context (HCtx), together called a part-descriptor. Here a different container "Container2" (introduced in FIG. 9), can hold these various part-descriptors for the entire computer file, along with an optional overall hash (H8) of the entire computer file. In some embodiments, the invention may further asynchronously use the computer file to also generate and transmit an original computer file hash (such as H8) comprising various file-part-hash-context values for at least some of the parts.

In the figure, the asset (the 7 row box on the right) has been decorated with its hash (H8). Each of the components refer back to a portion of the asset, but can be individually accessed.

In some embodiments, the invention may further asynchronously use an at least one transmitting network peer computer to transmit the original computer file hash, and asynchronously use the at least one receiving network peer computer to receive the original computer file hash as a received original computer file hash.

In some embodiments, the original or received computer file hash may not be completely generated until some or even all of the parts have already been transmitted, and any of the at least one transmitting or receiving network peer computer uses a received part's hash context to perform a hash operation for a received part with a larger offset, concluding by completing the hash operation on the last part of the file, using the hash context received for a part with a smaller offset to continue the hash operation through to the last part.

Figure 11:
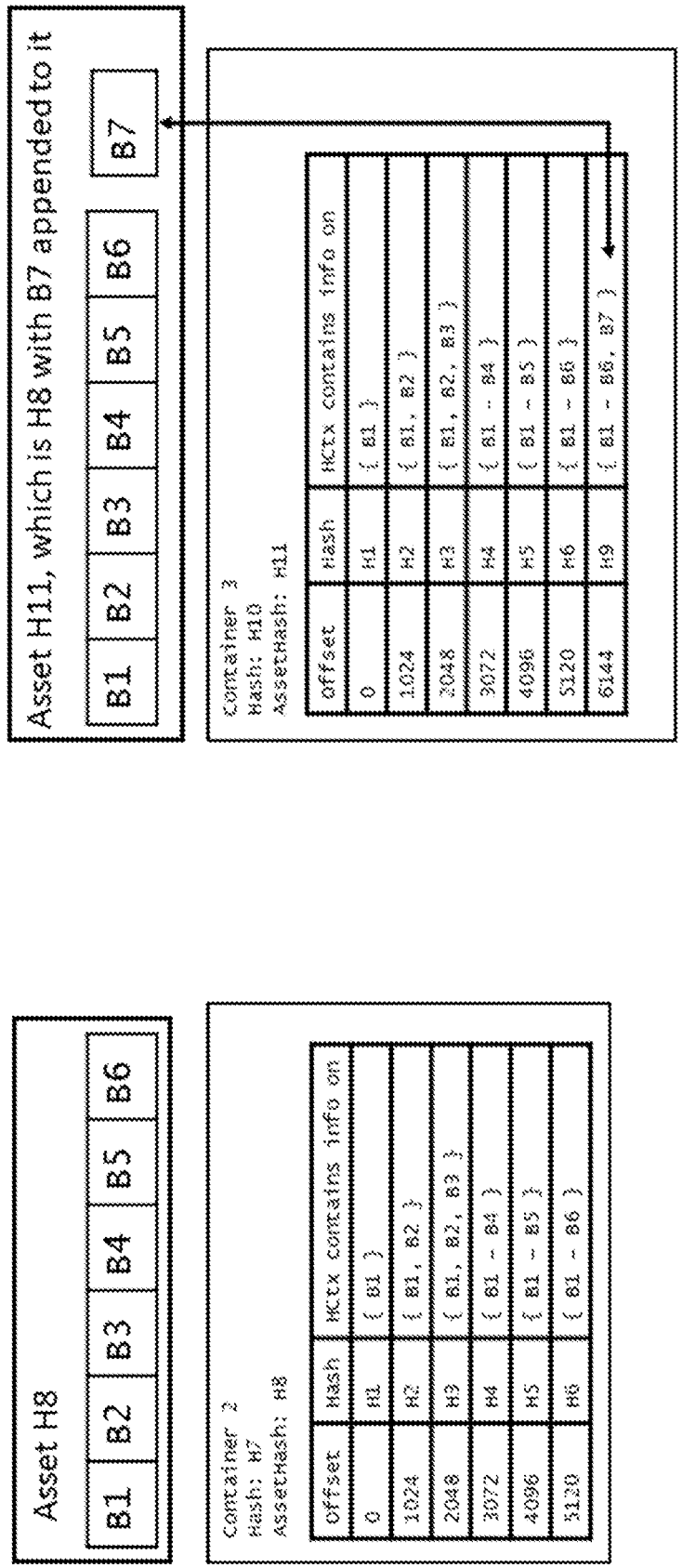
FIG. 11 shows how hash re-generation can be achieved when a file is appended to at the end.
Figure 12:
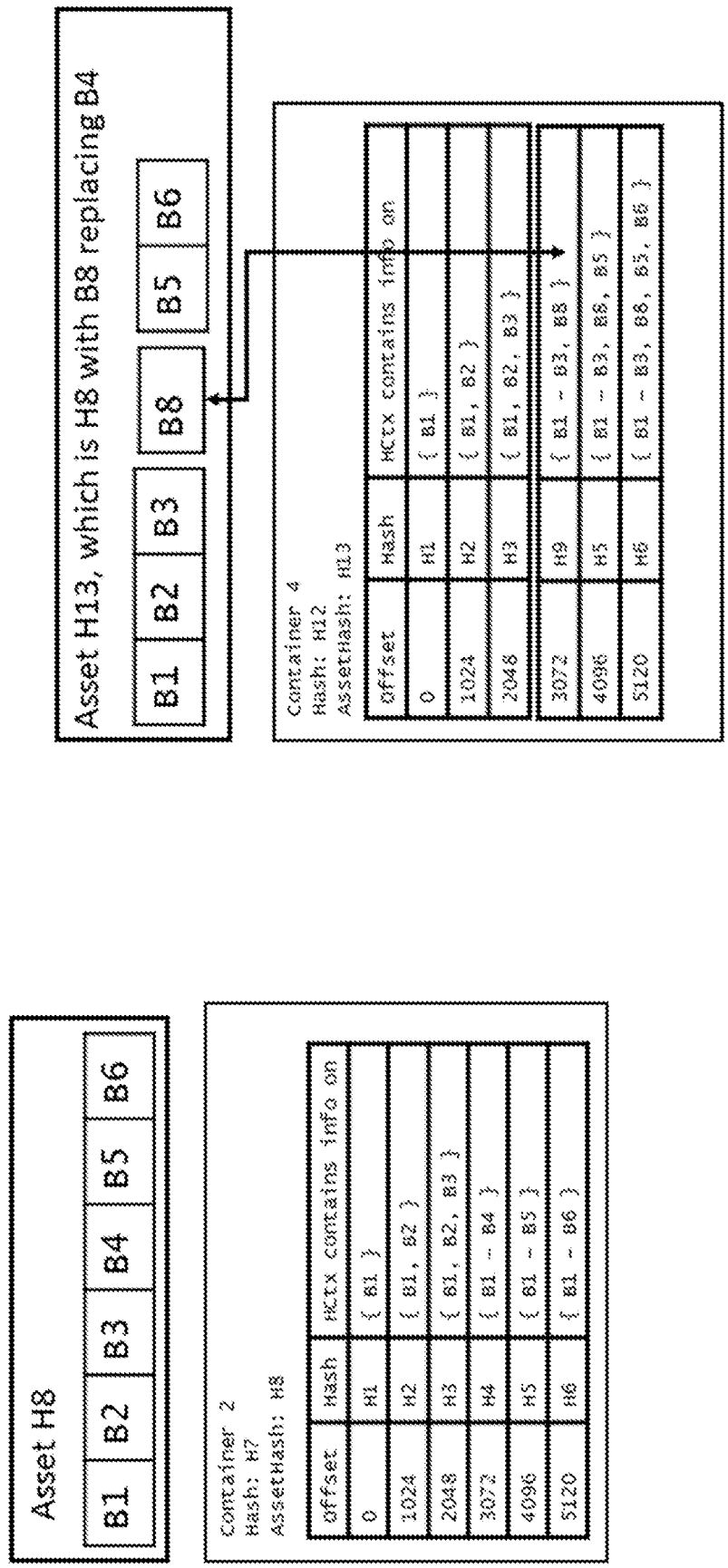
FIG. 12 shows the case when a component is swapped out with another.

FIG. 11 through FIG. 13 shows how hash re-generation for modified files can be accelerated for various scenarios. FIG. 11 shows how hash re-generation can be achieved when a file is appended to at the end. FIG. 12. shows the case when a component is swapped out with another. FIG. 13. shows the hash re-generation acceleration when the file modification operation overlaps existing components.

FIG. 11, details how if asset H8 is ever modified by appending to its end, the hash calculation can simply restart from the end of Component 6 (utilizing its HCtx), and peers will be notified with yet another Meta-Update message regarding the relationship between H7, H8 and the new part (hash H9, from the byte sequence B7), the new container representing {H1-H6,H9} (hash H10), as well as the newly modified file H8 which will have the hash H11. Container H10 will refer to parts H1-H6 as well as the new part (hash H9) which contains the sequence of bytes appended to H8.

In other words, generating the hashes H11 and H9 only need to examine the byte sequence B7, but with two different hash contexts—first is the HCtx from H6, the second is the initial hash context of the hash algorithm being used.

Note that the numeric offsets are purely illustrative, and should be used only to differentiate the offsets for each of the parts.

The Meta-Update message being sent out is "Container H7 representing H8 was modified to append H9 to its end, resulting a container H10, which represents the new file H11"

FIG. 12 shows a modification operation where a component is replaced. Here, file H8 from prior examples is modified by replacing component 4 (H4) with the byte sequence B7.

In this case, the byte sequence B7 is assumed to have the same hash (H9) as prior examples.

The hash context of the part H3 (which contains info about the byte sequences {B1, B2, B3}) is now uses to recalculate the hash of the newly modified file H8. Unlike FIG. 11, this time, the asset still has 6 components, but the latter 3 component's byte sequences need to be re-examined to calculate the hash of the modified file. However, because the part's offsets align with the region of modification, the last two component's hashes do not need be recalculated.

Again, in this case, the part's offsets are purely illustrative. Even if the length of B7 is not the same as that of B4, the hash recalculation still remains the same.

In some (preferred) embodiments, the Meta-Update message that is sent out to the peers is "Container H7 referring to file H8 has been modified with H9 overlapping at position 3072. The resulting container is H12, which refers to file H13."

FIG. 13 shows a modification operation where a component is again replaced. Here, file H8 from prior examples is modified by replacing component 4 and 5 (H4, H5) with the byte sequence B7 but with some overlap. The byte sequence B7 is assumed to have the same hash (H9) as prior examples. In this case, two new parts are produced (F1 and F2) which are the regions from B4 and B5 that do not overlap with the newly placed B7.

As in FIG. 12, the hash context from H3 is utilized, and the latter 4 components' byte sequence must be examined to calculate the hash of the newly modified H8.

In some preferred embodiments, the Meta-Update message that is sent out to the peers is "Container H7 referring to file H8 has been modified with H9 overlapping at position 3584. The resulting container is H15, which refers to file H16."

Advanced Discussion, and Additional Embodiments

In some embodiments, the REVNET protocol can also perform in the following manner when distributing a new asset from one node (network peer computer) to another.

1. Generate a partial hash for a small representative sample of the asset. This hash becomes part of a Container object which contains references to sub-objects. This thread can be called the Generator Thread. To reduce latency to undetectable levels, REVNET generates a preliminary Container object with only a small sub-object (i.e. Component). Only the hash of the initial Component, and the Container (which initially contains a reference to a single Component) are generated. On modern computer systems, the hash for a small object (on the order of up to several dozen megabytes in size) can be generated within a tiny fraction of a second.

2. Once the preliminary hash is completed, the Generator starts new threads that broadcast the Container (with only a preliminary hash) as well as the contained sub-object to a list of peers. These threads are called Sender Threads.

3. As additional portions of the asset are hashed by the Generator, it spools up additional threads that start broadcasting the newly hashed portion of the asset, as long as resources (threads, remaining network bandwidth per some time interval) are available.

4. At the same time, each node in REVNET is listening for incoming traffic. Incoming requests are self-contained messages that contain one of the following: a request for an object, payload for an object (with or without a request for acknowledgement), acknowledgement for an object (or a portion thereof), or an error message, or a meta-update message. Meta-Update messages contain information about changes to the hash of an object.

5. Each node (or peer) within REVNET can participate in the distribution of assets, as long as the node possesses at least some portion of the asset. This multiplies the effective throughput of the network copy operation because multiple nodes can be sending multiple portions of the asset to its desired destinations.

6. Each node (or peer) within a REVNET can start requests at any time, and the protocol requires that it service requests that comes in.

7. A node can enter and leave a distribution group at will.

8. Once a node receives all portions of an (sub)object, it verifies the hash. If the object's hash matches, the node advertises to the peers that "I have this object, and its good." If the object's hash does not match, it advertises differently "I no longer have this object. Send it to me again, please".

9. If the verified object is a Container, and all parts of the Container have arrived, REVNET validates the hash for the Container and advertises—"I received this Container object A with its hash B, which now has been updated to hash C". This class of messages are called Meta-Update Messages herein. If a node receives such a meta-update message (explained below, in Definitions), it cleans up any Senders that refer to the old hash, and requests the new objects as needed. If there are missing Components, the node responds with "I am still missing the following Components, please send them to me."

In these Embodiments, the Following Definitions May Also Apply:

REVNET—the system(s) (usually plural), methods, and software which implement the invention described in this document. The invention can be any of a method, system, or a non-transitory computer storage medium for computer code for a processor to implement the method and system versions of the invention.

Node—A single system within a REVNET, i.e. a network peer computer. Typically, new Assets (computer files) are introduced from a single Node, often called the transmitting network peer computer. Multiple Nodes can cooperate to distribute assets across the network. In this disclosure, "node" and "peer" and network peer computer are used interchangeably. The plural form "peers" are often used to mean a group of neighboring nodes that interact—e.g. "peers of a node" means a group of neighboring nodes of a specific node that interact with each other within REVNET.

Hash—a constellation of prior art, starting with the venerable CRC (Cyclic Redundancy Check). CRC32 reduces a sequence of bytes of any length to a single 32 bit (4 byte) integer. Other hashing algorithms generate a larger "number" that represent the object being hashed. For example, SHA256 generates a 256-bit number which is 32 bytes in size. SHA512 generates a 512-bit number, which is 64 bytes in size. SHA3-256 and SHA3-512 algorithms generate the same size hash values as their corresponding SHA-2 but have different initial contexts and the calculation operations are different from the SHA-2 counterparts. All Hash algorithms use a temporary buffer (initialized specially for each type of hashing algorithm) which contain the intermediate state of the hash calculation. Once all of the data is processed, the hash value is then generated from this buffer. This buffer referred to as the hash context (HCtx), explained below. For modern hashing algorithms such as SHA256, the calculated hash value can effectively serve as the de-facto name of the hashed item. If the hash values are different, the items hashed are different. If the hash values are the same, the items can be assumed to be the same, as the probability of the items being different is astronomically small, and not worth worrying about.

Asset—(or somewhat redundantly, Digital Asset)—some set of files, of importance to the Customer. This is frequently referred to in the alternative as the "computer file".

Request—a generic term for REVNET protocol messages encoded in a network packet that contains one of the following:
A request for an object (e.g. a part or container).
payload for an object (that is, the actual bytes that belong to a portion of the asset in question). The payload can also mark whether an acknowledgement is required.
Acknowledgement for an object (or a portion thereof),
Error message (such as, "I am busy, stop sending", "Object didn't verify! help!")
Meta-Update message—either a notification that an object has changed its hash, or an acknowledgement thereof Container—A Container object (containers) are usually significantly smaller in size than the actual asset (computer file) it refers to. Containers typically comprises a list of part-descriptors that in turn comprise the part-hashes (e.g. hashes of the component objects) and the relative positions (part-offsets) of the part (Components). For example, a one gigabyte file split up into 1-megabyte (non-overlapping) chunks requires 1024 hashes for each of the 1-megabyte chunks. A first container for a first part may have only one part-descriptor, but a last container for the last part may be a list or small database containing 1024 part-descriptors! Therefore, in this example, the maximum size of a largest Container object (container) may be on the order 1024*(sizeof(hash)+sizeof(length)+sizeof(offset)). This is a size of about 40-kilobytes or so. (Note that if the asset (computer file) is small enough, then the asset (computer file) can be hashed and sent directly as a single non-composite object.)

Component: a component is often referred to as a "part", that is a smaller part of the larger computer file. Each component or part contains that portion of the data from the larger computer file. If a computer file is a book, a component or part would be a chapter or page in that book, and contain the data from that portion of the book.

A Component object: In some embodiments, the part may be bundled with its associated part-descriptor and other data. In these embodiments, this bundled part and part descriptor is sometimes referred to as a "component object". Such component objects may, for example, comprise a sequence of {offset, length, hash, data{ }, HCtx}, where HCtx is the hash context for that particular part. The hash is 32 bytes in size (for SHA256). The bundled part can be carried in the data field as a sequence of contiguous length number of bytes. The hash is the hash for the data (e.g. its the part-hash value). Typically, Component's offset field is always zero. The actual position of the Component (part) within the Container is described in the Container. In some embodiments, a same Component (i.e. its hashes are identical) can appear multiple times within a Container or a multitude of containers. If the Component only has one sequence of data, the offset field can be omitted. The meaning of HCtx (or Hash Context) is explained below.

A component can be found in more than one container, i.e. a single component can belong to multiple containers. These arise when there are portions of multiple assets that are identical to each other. They are detected in REVNET during the hash computation for the part. If the part-hash is not new to the node, it means that a BLOB with identical hash has been processed by REVNET before. Detecting such cases leads to superlinear speedup for operations such as network copy.

Object—either a Container or a Component (part). An object is a representation of an asset or a portion thereof. Small assets do not need to be broken down into Containers and Components and is represented as a single simple Object. Crucially, an Object BLOB—Binary (Large) Object—Used in here to mean raw sequence of bytes, usually in-memory.

Container of Containers—in some embodiments, a container can comprise a plurality of components (and its associated part-descriptors). In some preferred embodiments, some of these components may themselves be Containers. This is meant to simulate a hierarchy or association of assets. One concrete example of such a hierarchy or association is a nested directory of assets and directories.

Part-descriptor—a synonym for "component object".

Generator—a thread running on a machine which is responsible for generating the hash of an Asset (computer file). The Generator starts by hashing a small portion of the asset, which becomes a Component of the Container object. Once this preliminary hashing operation is complete, the generated Container (and its initial one Component) is set for distribution within REVNET via Sender threads. The Generator then continues to hash other portions of the object and creates new Senders for each portion, as long as resources (thread, CPU cycles, network bandwidth) are available. Once the asset has been fully hashed, it notifies each peer that the preliminary Container is now complete by sending a Meta-Update message about the Container. Meta-Update messages are described below.

Listener—a thread responsible for listening and responding to incoming requests. If a request comes in for an object, the Listener spools up a new Sender for the object. It also distributes incoming payload to the appropriate object, and is responsible for notifying peers when portions of an object have either been received or is made available. It also updates the Senders when any acknowledgement messages from peers arrive, so that the Sender avoids sending duplicate portions.

Sender—a thread responsible for sending one object (either a Container or a Component) to a list of peers. It cooperates with the Listener so that only portions that are of interest to the peers are sent to the peers. It is typically the case that for new objects, the Sender starts off with a blank slate—i.e. since the object is empty, it can't send anything. Sender and Listener cooperate such that any arriving payload is stitched into the appropriate object, such that as soon as a validated portion of an object arrive at a node, that portion can then be distributed to other peers, as needed.

Meta-Update Message—this is a special kind of message sent by one node to others when it discovers that an object's hash has changed. This is the main mechanism for synchronization among REVNET peers in regards to the distribution of large assets with initially unknown hash. If one node completes the hashing process of a Container, it broadcasts a meta-update message to all interested peers informing them about the change of the hash (note that the object itself didn't change, only its hash did). In some embodiments, this can comprise notifying peer nodes regarding relationship between computer-file-hashes, their related container hashes, and the specific operations (which may modify the files) that connect them together.

Hash Context (or HCtx)—All hashing algorithms require a small secondary buffer to keep track of intermediate data while the hashing progresses. Once entirety of the file is examined, this intermediate buffer contains the final hash value for the file and can be thrown away afterwards. This buffer (henceforth "hash context" or HCtx) is utilized in REVNET. The Generator saves a copy of this intermediate hash state for the current Component along with the Component. This is important for immediate continuation of the network copy when the network copy either fails or is interrupted for some reason. For example, If a Sender is interrupted while generating the 8th component of an asset, it can restart the distribution process later by utilizing the saved HCtx from the $7^{th}$ Component, because the HCtx of the $7^{th}$ Component contains the intermediate state of the hash computation right as the last byte of the $7^{th}$ Component is processed. Therefore, the hashing can continue from the first byte of the $8^{th}$ component without needing to re-generate the hash for the first seven components. For small numbers such as 7 or 8, this improvement seems trivial, but suddenly becomes much more useful when the number of components is in the thousands or millions. For example, for CRC32 (Cyclic Redundancy Check), there is a small intermediate buffer. This buffer is simply the single machine word of 32 bits that contains the intermediate CRC value. Because the CRC (and all other hashing algorithms such as SHA256) modify the intermediate value (i.e. HCtx) by some calculation that sequentially examine the file from start to finish, this HCtx (e.g. the intermediate CRC value, for when the hashing in question is CRC) then can be saved, and the CRC calculation can be resumed from any point within the file.

File-Part-Hash Context—This is the hash context associated with a given Part (component). It contains the intermediate hash computation state, starting from the beginning of the file to the end of the given part. In other words, for the first part, its part-hash-context contains the computation state from the first byte of the asset (file) to the last byte of the part. Similarly, the file-part-hash context for the third part contains the computation state of the hash from the first part, the second part, and the third part, in sequence—i.e. from the first byte of the asset to the last byte of the third part. In other words, in some preferred embodiments, a node can verify the container by starting from an arbitrary component (part) and hash the later portions of the file starting from the end of that component by using file-part-hash context of that part (which contains the intermediate hash state from the beginning of the file through to the end (i.e. last byte of) that component) to continue the hash operation from the first byte of the next component through to the last part. It is important to note that this file-part-hash context is NOT used to generate the name of the part (component). The name of the part is generated from calculating the hash of the part with respect to an empty initial hash context.

Additional Details on Sender, Generator and Listener

Sender, Generator and Listener cooperate to ensure a seamless transition from start to finish, such that once a Container is completely hashed, the peers are notified that the preliminary Container has been updated with a new hash (as well as the actual hash of the asset) via a Meta-Update message.

It is possible that a node already happens to have either the new Container, or any of the Components within it. If the objects are new to the node, it then requests the new objects from its peers. If they are available (at least partially), then the node assists in distributing the portions of the objects it has to the interested peers.

Note that even if the entirety of an object (either Component or Container) is not yet available at the node, it can still assist in distributing the portions of the objects that it does have. As additional portions of the Objects in question arrive at a node, any new portions are integrated into its local database, and such new portions then can also be distributed to other peers, as requested.

Typically, the type of the asset guides the initial hash generation—i.e. which portions of the asset is quickly examined to generate a rough initial hash. If the file type is unknown, then REVNET segments the asset into fixed length chunks.

Some crucial differences between Bittorrent (and similar protocols) and REVNET are:

1. REVNET does not need to hash the entirety of the asset before network operations begin.

2. REVNET can instantaneously resume the distribution AND hash verification of an interrupted network copy of a previously unknown Asset by saving the HCtx (i.e. the part's file-part-hash context) and the intermediate Container and Component objects.

3. Peers other than the initial Generator can resume verification of the asset in the middle—i.e. Peers can verify later portions of a large asset even if the prior portions have not yet been received. This is important for recovery from catastrophic/pathological error cases.

There are additional distinguishing features of REVNET, discussed below.

In REVNET, a Component is decorated with the intermediate hash state of the original asset from which the Container and this Component derives from. That way, when other Peers receive this component, they can also continue the hash verification of the entire asset. This also allows peers to verify later portions of a large asset even if all of the prior portions have not yet been received. Crucially, a component may already be registered with a different Container (i.e. a completely different asset or computer file) at a different peer node. In such cases, it is very possible that a part with a larger part-offset may finish sending and verification because now there are more than one originator of that component. Once that component is received, the hash verification for the first computer asset file can continue at this new node, quite likely finishing before the original sender node finishes sending that component.

One very important efficiency gain is the realization that the hash for the Component's byte contents can be generated at the same time as the continuing hash operation of the original asset. Conceptually, the same memory buffer (with the contents of the Component) is examined by two different hashing operations. The first hashing operation is the continuing hash operation for the original asset. The second hashing operation is purely for the contents of the Component. In other words, at any given time, two different Hash Contexts are being operated on by the Generator. The first one (let's call it HCtx[0]) is the hash context that will contain the final hash of the asset. The second one (let's call it HCtx[j], where j is the "j'th component" of the Container, where j ranges from 1 to N, where N is the number of Components in the Container).

This drastically improves caching behavior of the CPU. In modern multi-core CPUs, the cost of generating a hash at the same for the same data region where two threads are examining the same region of memory (and is doing identical computation) is typically much faster than sequentially running both computations. When properly optimized, the total time required for generating the full hash for the original Asset as well as generating the required N separate hashes for the N components is at most a few percentage points more than generating only the hash for the Asset. Note that even though the actual computation of the hashing operation for the Container as well as each Component is the same, they use different hash contexts. HCtx[0] is the hash context for the original asset (i.e. what the Container refers to). HCtx[0] will be duplicated after each component is hashed to become the file-part-hash context for that part. HCtx[j] is the hash context for the j'th Component of the Container, used to generate the hash for that part only.

In some embodiments, the following aspects may also apply:

1. Any one of the nodes participating in the distribution of an asset can be the first to verify an object (and its subobjects—e.g. Components). Once this is done, the rest of the peers are then told of the actual hash of the Container via a "Meta-Update" message. This is required because the actual hash of the Asset is unknown at the start. Note that the Asset, the initial Container (which only refers to one Component), and the final Container (which refers to all N Components)

will have different hashes, and the Meta-Update messages serve to notify the relationship between the three.

2. The hash of the Container is merely the hash of a sequence of hashes of the Components it refers to. As stated above, the hash of the Container is different from the hash of the actual entirety of the asset because the Container merely contains the list (and positions) of the Components. Initially, the container has only one component registered with it, but as the Generator progresses, additional Components are registered with the Container.

3. While a node is working with an out-of-date Container object, it may receive a Meta-Update message, notifying it that the original Container is now obsolete, and that a new hash is available for the obsolete container. Once it receives such a meta-update message, it invalidates the old Container object (but not the actual contents) and then requests the updated Container object from its peers if it did not have it already. Any portions of the object that has already safely arrived are atomically moved to the correct entry in the database and the distribution resumes uninterrupted. Once the new Container object has been received, the node can then request any Components that are new to the node from its peers. Naturally, incoming requests for the old out-of-date container is responded to via a Meta-Update message, notifying the peer that the hash has changed.

4. The distribution of the objects (i.e. the Sender threads) stops once each peer has decided either to drop out—i.e. if no new requests regarding the objects arrive within a certain period of time or via a manual process, or if all peers report that all portions of all assets have been correctly received.

In some embodiments, REVNET features global error correction. Nodes that participate in REVNET protocol can be part of a distributed file system with strong guarantees of correctness. REVNET peers participate in distributed correction and isolation of faulty peers. Payload from peers can be checked for validity. If the error rate of a peer is above an acceptable threshold, or if the node itself has failed to verify a (sub)object, the error is reported both to the peers and to the user.

Objects that failed hash verification are removed from the database.

Error-prone peers are removed from distribution tasks. They are re-added by explicit user intervention, or upon passage of an agreed upon time period, or upon receipt of an "I rebooted, and all of my stuff has been verified" message.

No protocol is completely immune from intentional mischief and/or hardware failure. However, with nominal due diligence from users, REVNET can provide robustness guarantees as well as super-linear speedup of network copy operations in many different occasions.

Note further the distinctions between these embodiments and the prior art.

1. REVNET does not need to the hash the entirety of the asset before network operations begin.

2. REVNET can instantaneously resume the distribution AND hash verification of an interrupted network copy of a previously unknown Asset by utilizing the saved HCtx and the intermediate Container and Component objects.

3. Other peers other than the initial Generator can resume verification of the asset in the middle—i.e. Peers can verify later portions of a large asset even if all prior portions have not yet been received. This is important for recovery from catastrophic/pathological error cases.

4. Since each node within a REVNET forms part of a distributed file system, REVNET can drastically improve effective network bandwidth by not sending duplicated chunks, even among assets that are seemingly unrelated. This was alluded to earlier in the Definitions section. Crucially, multiple Containers may contain references to the same Component. This case is only detectable within the context of a database of objects (e.g. a File System that tracks hashes of the files stored therein) that spans multiple nodes within an intranet like REVNET. Once duplicate components are detected, they are never sent unless absolutely necessary. In other words, the network copy of a very large asset can be accelerated significantly, above and beyond the increased bandwidth from cooperating peers because duplicate Components among different assets are detected and is transmitted only when necessary.

5. Since REVNET has strong global guarantees of correctness, unintentional distribution of mangled assets will be detected automatically.

6. REVNET effectively assigns a temporary hash to an unknown Asset when it creates the initial Container. Once the Container has been fully hashed by a node (note that this node doesn't have to be the original node that started the hashing), the Asset (represented by the Container) now has its actual hash, and all peers of the node are notified of the change of hash.

7. Although we motivate via reference to fast, zero-latency network copy operation over an intranet, there is no requirement in REVNET that all peers belong to a specific intranet. All that is required is for a node to participate is that it has a digital certificate that specifies the privileges it has with respect to specific peer groups (e.g. intranets) it wishes to operate with. The methods, systems, and software for the certificate-based authentication system is beyond the scope of this disclosure.

8. Modifications to the files stored in REVNET (e.g. appending to a file, truncating a file at a specified position, replacing contents somewhere in the middle) will mean that the modified files will need to have their hashes regenerated. REVNET can reduce the required time for hash-recalculation by taking advantage of the stored hash contexts for the affected component parts. For example, referring to FIG. 10-13, appending to the end of a file will no longer require examining the original parts. Only the new data appended to the end will need to be re-hashed, utilizing the hash-context saved with H6 to generate the new hash for the entirety of the modified file. REVNET then notifies peers regarding any change operations to the file via Meta-Update messages.

Distinctions 4-8 discuss other distinguishing features of REVNET.

Distinction 8's implications are far-reaching. Refer once again to FIGS. 10 through 13.

In some embodiments, if the file in FIG. 11 (named H8) is ever modified by appending to its end, the hash calculation for the modified H8 can be accelerated by utilizing the hash context for the part H6. In other words, only the new part (which appended to the old end-of-file position of file H8) need to be hashed with the hash context from part H6 to generate the new hash for the entirety of the modified H8 file. Let's assume that the new addition to file H8 is calculated to have hash value H9, and the container that represents this newly modified H8 is calculated to have hash H10, and that the newly modified H8 file is now assigned the hash value H11. These hashes may be generated without needing to re-examine the first six parts of H8. For small numbers such as six or seven, this improvement might seem trivial, but if the number of components is in the thousands or millions (with each component in the range of several megabytes in size), the savings in hash generation time alone may be substantial. In these embodiments, a Meta-Update message will be sent out, notifying peers as to the relationship between H7, H8, H9, H10 and H11 as being "Container H7 representing H8 was modified to append H9 to its end, resulting a container H10, which represents the new file H11". Similar speedups to hash generation time can be made even if H8 was modified in the middle somewhere between its start and end-of-file position offsets.

When dealing with very large files, hash-calculations may require significant amounts of time when starting from scratch. However, in some embodiments, REVNET's hash (re)calculation start from scratch only if the file is (apparently) entirely new. In all other cases, REVNET's hash re-calculation may start at the point of modification, or at worst, at the nearest component whose offset in the file is closest to the offset of the file modification. By utilizing the saved hash context, hash calculation time can be drastically reduced by reducing the number of bytes that need to be examined by the hash calculation. The amount of data that need to be examined for hash-recalculation is the size of the modification in bytes if the offset, (e.g. point of modification) is aligned with the part-offsets. If the part-offsets and the modification offset are not aligned, the number of bytes required to be examined is the size of the modification in bytes plus the sum of the sizes in bytes of the part(s) that overlap the region of modification. The hash context that is utilized is the hash context of the file-part that has an end-position closest to that of the modification offset such that the modification offset start minus the end position of the part is the smallest number greater than or equal to zero. Refer to FIG. 12 for an exposition on this case.

If the modification operation is non-truncating, then the rest of the file after the modification will obviously need to be re-examined as well to recalculate the hash of the entirety of the modified file. However, for the component (e.g. file-parts) that follow the modification and does not overlap with the modification range, their individual hashes will not change. In other words, only the components that overlap the modification regions in the file will need to have their individual hashes recomputed. Refer to FIG. 13 for the scenario where the modification region overlaps multiple components.

In all cases, the calculation of the hash of the Container (which serves as a standin for the actual file) will be extremely quick relative to the hash computation of the entire asset (e.g. computer file) as well as the hash calculation for the individual components. A modified file will always have at least one valid name (e.g. hash) that the node as well as its peers can use to refer to the modified file. This name/hash is that of the associated container, which will once again serve as a stand-in until the actual hash for the entirety of the modified file can be recomputed. As discussed above, the special case of when a file is appended new data at its end is discussed in FIG. 11. The case when the modification aligns with the part-offsets is discussed in FIG. 12. The case where the modifications do not align with the part offsets is discussed in FIG. 13.

Here the invention further teaches reducing the required computation time for recalculation of the hashes of modified files by utilizing the part-hash-context-value of the part that ends closest to the offset of modification, such that the modification start offset minus the end of the file-part is the smallest zero-or-positive number, so that the amount of bytes required to be re-examined by the hashing algorithm is reduced.

If the modification of the file is purely shrinking the file, then the hash-regeneration acceleration is similar to what happens with the append-at-end scenario. Only the part that refers to a region in the file that overlaps the new end-of-file marker will need to be re-examined to re-generate the hash for the truncated file.

The disclosed system and methods have been experimentally shown to be capable of recovering from relatively high transient network transmission error rates. The protocol can also recover from errors in the storage medium. The time required for error recovery is proportional to the density of erroneous data (either in-situ, or in-transit). We have also experimentally verified that assets can be regenerated fully, even if the entirety of the asset is no longer available in the original node due to errors or other failure cases. All that's required for REVNET node to rebuild an asset is that all parts of an asset are available somewhere.

Put alternatively, certain aspects of the system or method described herein include:

The invention can be system or method of copying files across a network such that the complete hash of the files being sent are not generated a-priori.

This system/method can operate by creating an initial Container consisting of one Component object (part), and co-generating the hash of the first Component (part) alongside the continuous hashing of the asset (computer file). The invention can further operate by sending the hash context for the first Component (part), which may be stored in the initial container, along with the Component (part) to interested peers (network peer computers).

This system/method allows a recipient network peer computer, to resume the hash operation of the various parts, or even the entire computer file, by utilizing the hash context received along with the first Component (part). Thus, for example, the system and method can be configured to resume the hash operation of those transmitted computer files (and file parts) at a network node (e.g. other network peer computer) other than the originator (original transmitting network peer computer) by utilizing the hash context (usually stored in received containers) of any of the components (parts) that the node (other network peer computer) may have received.

After the initial first component (part) is generated, often the originating network peer computer will then continue the hashing operation of the original asset (computer file) and generate additional Components (parts) and associated containers. This can be done by, for example, co-generating the hash of the additional Components (parts) alongside the continuing hash of the asset (computer file). The system/method can then send the hash context for each additional Component (part) (again often bundled in later containers) along with the Component (part) to interested peers (receiving network peer computers).

In some embodiments, either the initial transmitting network peer computer, or other network peer computers, will update (e.g. transmit a message) other network peer computers as to the hash of the asset (computer file) when the hashing operation of the asset completes. This allows the network peer computers to be further notified of the relationship between the one or more hash values stored in the various containers, and the hash of the complete computer file.

In this embodiment, this process thus further updates the various network peer computers as to the various hashes stored in the various containers, such as the initial Container, and the final Container. This allows the various network peer computers to be further notified of the relationship (e.g. receive further confirmation) between, for example, the hash values stored in the initial Container and the hash values stored in the final Container. The various network peer computers can be updated as to the hashes of various containers, (such as final Container) and the asset (computer file) to ensure that the peers are notified of the relationship between, for example, the hash of the final Container and the hash of the asset (original computer file) it refers to.

As stated earlier, this disclosure motivates by mainly discussing methods, but may apply to system as well as non-transitory computer storage medium for computer code for a process to implement the methods and system versions of the invention.

The invention claimed is:

1. A method of transmitting a computer file across a network, said method comprising:
    using at least one transmitting network peer computer, and a hash operation, to divide said computer file into a plurality of smaller parts, and describe each part with a part-hash-value, a part-offset, and a file-part-hash-context value, thereby creating a plurality of part-descriptors;
    each said part-descriptor comprising said part-hash-value, said part-offset, and said file-part-hash-context value;
    wherein said file-part-hash-context value comprises an intermediate state of an original computer file hash, produced by said hash operation, from a beginning of said computer file to a position of a given part in said computer file;
    wherein, for an arbitrary part, said arbitrary part's part-hash-value is produced by said hash operation on said arbitrary part from a beginning of said arbitrary part to an end of said arbitrary part;
    wherein, for a last part of said computer file, said hash operation on a file-part-hash context-value of the part prior to the last part, and said last part, equals said hash operation on said computer file;
    generating part-descriptors for each said parts, packaging at least some of said part-descriptors in at least one container; and transmitting at least some parts, and said at least one container with at least some of said part-descriptors, to at least one other receiving network peer computer;
    receiving, at said at least one other receiving network peer computer, at least some parts as received parts, and received containers comprising at least some said part-descriptors as a received part-descriptors, thus receiving at least some received parts, received part-hash-values, received part-offsets, and received part-hash-context values;
    using said at least some said received parts, said received part-hash values, said received part offsets, and said received part-hash-context values to perform any of:
    a) identify missing/corrupted received parts or missing/corrupted received part containers with missing/corrupted part descriptors, and sending network requests for said missing/corrupted received parts or missing/corrupted received part containers;
    b) create a candidate received computer file, and using said hash operation to compute a candidate received computer-file-hash, and verifying accuracy of said candidate received computer file by comparing said candidate received computer-file-hash with said hash operation on at least one received part-hash-value and this part's corresponding received file-part-hash-context value, through to the last part;
    c) continuing a hash operation on a received candidate computer file in an absence of certain received parts, by taking from a received container, a received file-part-hash-context value of a file part with the largest part offset, and using its received file-part-hash-context value to continue with said hash operation in an absence of at least some received parts with smaller part offsets;
    d) reducing a required computation time for recalculation of hashes of any modified files by utilizing a part-hash-context-value of the part that ends closest to the offset of said modification, such that the modification start offset minus the end of the file-part is the smallest zero-or-positive number, thus reducing the number of bytes required to be re-examined by said hashing operation;
    e) notifying peer nodes regarding relationship between computer-file-hashes, their related container hashes, and any specific file modification operations that connect them together.

2. The method of claim 1, wherein said part-offset is an offset of said part in said file relative to a start or other reference location of said file.

3. The method of claim 1, wherein said containers comprise a plurality of containers, at least some containers comprise a plurality of part-descriptors, and new containers are created and retransmitted by at least one network peer computer as said hash operation progresses through at least some of said parts in said computer file.

4. The method of claim 1, further asynchronously using said computer file to also generate and transmit an original computer file hash comprising said file-part-hash-context values for at least some of said parts.

5. The method of claim 4, further asynchronously using said at least one transmitting network peer computer to transmit said original computer file hash, and asynchronously using said at least one receiving network peer computer to receive said original computer file hash as a received original computer file hash.

6. The method of claim 4, wherein said original or received computer file hash is not completely generated until any of said at least one transmitting or receiving network peer computer applies said hash operation to a last received part, using any prior received part's said hash context to continue the hash operation through to the last part.

7. The method of claim 1, wherein when an accuracy of said candidate received computer file cannot be verified:
    using said containers to determine which parts or selected part descriptors have not been received, thereby defining any of not-received parts and not-received containers, and sending at least one network request to transmit or retransmit any of said not-received parts, and not-received containers.

8. The method of claim 1, wherein those part hash operations used to generate said part hash values and said computer file hash comprise any of SHA family hash operations, and other hash operations chosen to minimize a probability that two different parts will be assigned a same part hash value.

9. The method of claim 8, wherein said SHA family hash function comprises any of SHA2 and SHA-3 family of hash functions.

10. The method of claim 8, wherein said probability is less than 1 in $10^{80}$.

11. The method of claim 1, wherein using at least one transmitting network peer computer to generate part-descriptors for each said parts, packaging at least some of said part-descriptors into a container; and transmitting at least some parts, and said container with at least some of said part-descriptors, to at least one other receiving network peer computer is done by any of a sequential, non-sequential, or random selection process with respect to said parts and part-offsets.

\* \* \* \* \*